United States Patent [19]

Lesea

[11] Patent Number: 4,672,522

[45] Date of Patent: Jun. 9, 1987

[54] POWER FACTOR CORRECTING NETWORK

[75] Inventor: Ronald A. Lesea, Redwood City, Calif.

[73] Assignee: XO Industries, Inc., Mountain View, Calif.

[21] Appl. No.: 628,822

[22] Filed: Jul. 9, 1984

Related U.S. Application Data

[60] Continuation-in-part of Ser. No. 505,780, Jun. 20, 1983, abandoned, which is a division of Ser. No. 323,676, Nov. 23, 1981, Pat. No. 4,415,839.

[51] Int. Cl.$^4$ ............................................. H02M 1/12
[52] U.S. Cl. ........................................ 363/48; 363/126; 323/208; 315/244
[58] Field of Search ................................ 363/39, 44–48, 363/125, 126; 315/205, 206, 244, 247; 333/174, 175, 176; 323/208

[56] References Cited

U.S. PATENT DOCUMENTS

| | | | |
|---|---|---|---|
| 1,860,102 | 3/1932 | Kouyoumjian | 323/206 |
| 3,010,064 | 11/1961 | Ross | 323/208 |
| 3,818,268 | 6/1974 | Peltz | 315/244 |
| 3,986,076 | 10/1976 | Rottier | 315/244 X |
| 4,222,096 | 9/1980 | Cadewell | 363/44 |
| 4,376,911 | 3/1983 | Kaneda | 315/244 |

FOREIGN PATENT DOCUMENTS

| | | | |
|---|---|---|---|
| 3012747 | 10/1981 | Fed. Rep. of Germany | 363/45 |
| 0163271 | 9/1983 | Japan | 363/45 |
| 0388954 | 3/1933 | United Kingdom | 323/206 |

Primary Examiner—Peter S. Wong
Attorney, Agent, or Firm—Thomas E. Schatzel

[57] ABSTRACT

An electronic ballast for energizing one or more gaseous-discharge lamps and for regulating the power consumed thereby, the ballast including a power supply for providing a source of DC power between a pair of outputs, a pair of transistors connected as switches in series between the power-supply outputs, the transistors for selectively coupling to the juncture thereof positive and negative potentials, a voltage-conditioning and current-limiting network for energizing the lamp from the potential developed between the transistor juncture and a power-supply common, and a pulse generator for developing pulses for driving each of the transistors in turn whereby a potential is developed at the transistor juncture which alternates as positive-going and negative-going pulses each separated by a dead time, the pulse generator for monitoring the power consumption level of the lamp and responsive thereto operative to vary the frequency and/or the width of the transistor driving pulses whereby the lamp consumption is regulated. Also included is a third harmonic trap for coupling the power supply to the AC power line to improve the power factor.

6 Claims, 3 Drawing Figures

POWER FACTOR CORRECTING NETWORK

CROSS-REFERENCE TO RELATED APPLICATIONS

This is a continuation in part of application Ser. No. 505,780 filed June 20, 1983, now abandoned, which is a division of application Ser. No. 323,676 filed Nov. 23, 1981, from which U.S. Pat. No. 4,415,839 issued.

BACKGROUND OF THE INVENTION

1. Field of the Invention

The present invention relates generally to the field of energy conversion for lighting and more specifically to an electronic ballast suitable for use with gaseous-discharge lamps.

2. Description of the Prior Art

Gaseous-discharge lamps, lamps in which light is generated when an electric current, or discharge, is passed through a gaseous medium, are not new to the lighting field. Fluorescent-type gaseous-discharge lamps have been employed for years to provide relatively efficient indoor lighting such as for office buildings. Recently, sodium-vapor-type gaseous-discharge lamps have been employed to replace less efficient lamps in outdoor lighting applications. For example, 250 watt sodium-vapor lamps are commonly used in street lights to replace 400 watt mercury-vapor lamps which are less efficient and which generate less light output. Sodium-vapor lamps in 70, 100, 400, and even 1000 watt sizes are also commonly used.

Unlike incandescent lamps which are self-limiting as a result of their positive-resistance characteristic, gaseous-discharge lamps have a negative-resistance characteristic. For this reason, gaseous-discharge lamps are operated in conjunction with a ballast which provides the requisite current limiting. Traditionally, ballasts are of core and coil construction. One form is that of a simple choke which provides an inductive impedance for current limiting. Another form is that of a transformer. The transformer form permits voltage conditioning such as providing a high break-down potential which is required for starting instant-start-type fluorescent lamps by ionizing to a plasma the gas therein. For rapid-start-type fluorescent lamps, a pair of windings are included in the transformer for energizing the lamp filaments and, separating the filament windings, a high-voltage winding having a high reactance for current limiting. Alternatively, a magnetic shunt may be included in the transformer to limit the energy transferred through the magnetic path.

Unfortunately, traditional core-and-coil-type ballasts are relatively inefficient having substantial heat generating losses that are generally equally divided between copper losses in the coil and core losses in the relatively inexpensive grades of iron employed therein. For example, it is not unusual for a tranditional core-and-coil-type ballast employed in a dual 40 watt lamp fixture to dissipate from 15 to 20 watts causing the ballast to run quite hot. Further, in many applications, such as in office buildings, this ballast-generated heat must be removed by air conditioning equipment which is itself relatively inefficient. Another problem is that core-and-coil-type ballasts are relatively heavy requiring that associated fixtures be more substantial than would otherwise be necessary.

The regulation afforded by traditional core-and-coil-type ballasts is also relatively poor. Typically, the operating level of fluorescent fixtures employing such ballasts varies as the square of the power-line voltage. Thus, in many applications, excessive lighting, dissipating excessive power, is often employed to insure that minimum lighting levels are achieved.

Compensation, at least in part of variations in line voltage, is often afforded for sodium-vapor-type gaseous-discharge lamps by employing therewith so-called constant-voltage, or ferro-resonant, type transformers having inherent current limiting. Unfortunately, such transformers are relatively expensive, heavy and bulky. Sodium-vapor lamps, moreover, present another regulation problem. Unlike fluorescent lamps across which a voltage drop is developed that remains relatively constant with lamp life, the voltage drop developed across a sodium-vapor lamp often varies as much as two to one during the life of the lamp. As a result, to insure that minimum light levels are achieved, sodium-vapor lamps are often overdriven during most of their lives, at the expense of both power and life, and/or excessive lighting is employed.

Among other problems associated with gaseous-discharge lamps is that they are less efficient when operated at the normal 60 Hz line frequency than when they are operated at higher frequencies. Sodium-vapor lamps often require special starting circuitry. Fluorescent lamps are often difficult to start when cold and, as a result, flicker for some time. Fluorescent lamps require core-and-coil-ballast phasing both to reduce stroboscopic effects and to increase the power factor such lamps present to the line via the ballast.

What may be referred to as an electronic ballast is disclosed in U.S. Pat. No. 4,277,728 which issued to C. Stevens. Included is a switching power supply for developing a source of DC power from AC line power, an inverter for developing a source of high frequency AC power from a portion of the DC power and an RF-type resonant network for coupling a portion of the high frequency AC power to a gaseous-discharge lamp. The resonant network both limits the lamp current and provides a voltage step-up for starting the lamp.

By increasing the frequency of power used to drive a gaseous discharge lamp, the electronic ballast disclosed by C. Stevens is advantageous in that it permits the lamp to operate more efficienlty. It is also advantageous in that the increased frequency permits much smaller, lighter and more efficient components to be employed for the current limiting resonant network.

In an embodiment illustrated in FIG. 4B of the C. Stevens disclosure, the inverter is shown to include an oscillator and drivers driving a pair of transistors. The transistors operate as switches series connected across the output of a DC power supply in what may be referred to as a totem-pole configuration. The resonant network is shown to include a pair of inductors and a capacitor connected in a T-type configuration. More specifically, the two inductors are connected in series from the juncture of the switching transistors to one end of the lamp, the distal end of which is connected to a common potential. The capacitor is connected from the juncture of the inductors to the common potential. The common potential is developed at the juncture of a pair of capacitors series connected in a voltage-divider configuration across the output of the DC power supply. A phase detector is also included for synchronizing the frequency of the oscillator with the resonant frequency of the T-type network. Further, a current-sensing resistor is included, evidently for developing a signal for controlling the power supply.

By synchronizing the frequency of the oscillator with the resonant frequency of the network, the transistors switch at current-null points, switching losses are reduced, the transistors are protected and the switching transistors appear to be driving a resistive load. Further, synchronization insures that a maximum voltage step up will occur.

The electronic ballast disclosed by C. Stevens does not employ a simple power supply of the type which includes a bridge, or other form of rectifier, to develop pulses of direct current from the AC power line and a filter capacitor directly connected to the rectifier to develop a relatively constant voltage from the pulses of direct current. Such a simple power supply is disadvantageous in that all the current is drawn from the AC power line in synchronization with the peaks thereof. these current peaks cause power factor problems and problems sometimes referred to as third harmonic distortion problems. The occasional use of such simple power supplies causes little problem. However, where a large number of such supplies are connected to a single power line, such as to provide power for the lighting in a whole office building, problems with the pole transformer and power line wiring may result.

To avoid these problems, the electronic ballast disclosed by C. Stevens employs a relatively complex power supply having a switching regulator disposed between the bridge rectifier and the filter capacitor. The switching regulator interconnects the rectifier and the filter capacitor for brief periods at a high, 20 kHz, rate to form a train of current pulses at the 20 kHz rate. The regulator includes circuitry for varying the width of the current pulses in synchronization with the power-line frequency to develop wide pulses during the peaks of the power-line cycle and narrow pulses during the valleys thereof. As a result, the power supply disclosed by C. Stevens draws power from the AC line so as to appear as a load having a near unity power factor. Unfortunately, the power supply disclosed by C. Stevens is relatively complex and expensive.

Other disclosures which may be considered of interest include the U.S. Pat. Nos. 4,060,751, 4,127,798, 4,251,752 and 4,253,046 issued to T. Anderson, J. Anderson, J. Stolz and Gerhard et al, respectively.

SUMMARY OF THE PRESENT INVENTION

It is therefore an object of the present invention to provide an electronic ballast which is efficient, simple and inexpensive and which operates one or more gaseous-discharge lamps in a highly efficient and regulated manner.

Another object of the present invention is to provide a simple and inexpensive power supply which is suitable for use in an electronic ballast and which operates at a relatively high power factor.

Briefly, the preferred embodiment of the present invention includes a power supply and a power-factor-correcting circuit coupling the power supply to the AC power line, the correcting circuitry for restricting the amount of power the power supply can obtain from the line during peaks of the AC cycle to improve the power factor of the power supply. Also included is a pulse generator and a pair of transistors operating as switches, the transistors being connected across the output of the power supply in totem-pole fashion and being driven by the pulse generator so as to develop at their juncture a series of alternately positive-going and negative-going pulses each separated by a dead time. Finally, a network is included coupling the pulses developed by the transistors to one or more gaseous discharge-lamps, the network for limiting the lamp current and, in some embodiments, conditioning the level of the pulses. The pulse generator also monitors signals representing the current conducted by the lamp and the voltage developed thereacross, or other appropriate signals, and varies the frequency and/or width of the pulses as necessary to regulate the power consumed by the lamp.

The present invention is advantageous in that it operates gaseous discharge-lamps in a highly efficient and regulated manner yet it is relatively simple and inexpensive.

Another advantage of the present invention is that it has a relatively high power factor.

These and other objects and advantages of the present invention will no doubt become apparent to those of ordinary skill in the art after having read the following detailed description of the preferred embodiments illustrated in the several figures of the drawing.

IN THE DRAWING

DETAILED DESCRIPTION OF THE PREFERRED EMBODIMENTS

Figure 1:
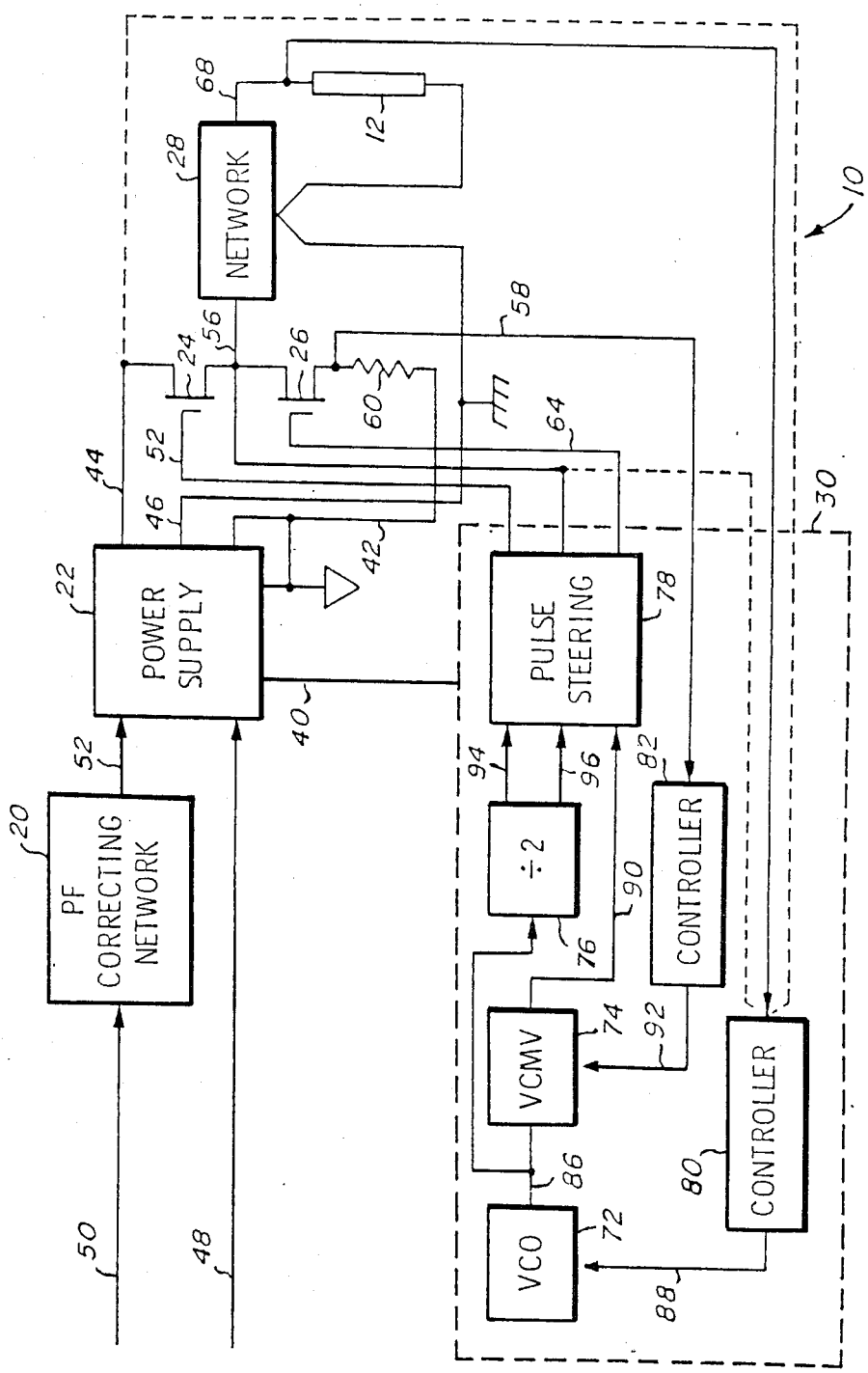
FIG. 1 is a combined block and schematic diagram illustrating the principal components of an embodiment of an electronic ballast in accordance with the present invention.

In accordance with the present invention, an electronic ballast suitable for use with one or more gaseous-discharge lamps is illustrated in FIG. 1 generally designated by the number 10, the lamps being represented by a single lamp 12. The principal components of ballast 10 are shown to include a powr-factor-correcting network 20, a power supply 22, a pair of transistors 24 and 26, a energy-conditioning network 28 and a pulse generator 30.

Power supply 22 is of conventional design and suitable for providing lamp 12 lighting power at one DC potential and power for operating the various components of ballast 10 at another, lower, DC potential all from AC power obtained from the AC power line. Specifically, a line 40 is maintained at the lower potential with respect to the potential developed on a line 42; and, a line 44 is maintained at the higher potential, also with respect to the line 42 potential. Further, a line 46 is maintained at a potential midway between that of lines 42 and 44 to provide a common or return potential for lamp 12. For 110 volt mains, the line 46 potential is the same as the neutral, AC line potential. Where the line 46 potential is not conveniently available, this potential may be developed by means of a DC blocking capacitor connected between line 46 and line 42, line 44 or any line having a potential related thereto. Where network 28 includes a capacitor or other means which perfoms the DC blocking function, line 46 may be directly connected to line 42, line 44 or other potentially related line. For understanding the operation of ballast 10, it is convenient to consider the potential developed on line 42 as being the reference potential.

However, the operation of power supply 22 is restricted by power-factor-correcting network 20 which dictates when power may be obtained from the AC line. More specifically, the input of power supply 22 is coupled to the AC power line by network 20. For 110 volt mains, the neutral line, represented by a line 48, is directly connected to supply 22 and the hot line, represented by a line 50, is connected to one end of network 20 the distal end of which is connected to the power supply by a line 52. Network 20 includes a trap (parallel tuned circuit) tuned to restrict the amount of power that supply 22 can obtain from the AC power line during peaks of the line cycle.

In the preferred embodiment, transistors 24 and 26 are metal-oxide-semiconductor, MOS, type power field-effect transistors, FETs, connected between lines 44 and 42 in what may be referred to as a totem-pole configuration so as to permit lines 44 and 42 to be selectively coupled to a line 56. In other words, transitor 24 has a drain which is connected to line 44 and a source which is connected to line 56. The drain of transistor 26 is connected to line 56; and, the source thereof, which is connected to a line 58, is coupled to line 42 by a current sensing resistor 60. Operation of transistors 24 and 26 is controlled by generator 30 which develops a transistor 24 gate-driving signal on a line 62 referenced to line 56 and a transistor 26 gate-driving signal on a line 64 referenced to line 42. Generator 30 sequentially drives transistors 24 and 26 in a non-overlapping fashion such that a potential is developed on line 56 in the form of alternate positive-going and negative-going pulses having dead time therebetween. This series of alternately positive-going and negative-going pulses is coupled to lamp 12 by a line 68 and network 28 which provides current limiting and, in some embodiments, voltage conditioning. Generator 30 monitors the operating parameters of lamp 12 by means of the signals developed on lines 58 and 68, including the current conducted therethrough, as evidenced by the voltage drop developed across resistor 60, and the voltage drop developed across the lamp and alters the width of the pulses or the frequency thereof so as to regulate the operation of lamp 12.

Generator 30 includes a voltage-controlled oscillator, VCO, 72, a voltage-controlled-monostable multivibrator, VCMV, 74, a divide-by-two flip-flop 76, a pulse-steering circuit 78 and pair of controllers 80 and 82. VCO 72 is operative to develop a high-frequency signal on a line 86 which is responsive, in frequency, to the level of a control signal developed on line 88. VCMV 74 operates to develop a series of pulses on a line 90 each having a width that is responsive to a control signal developed on a line 92 and which occur at the frequency of the VCO signal developed on line 86. The frequency of the signal developed on line 86 is reduced by a factor of two by flip-flop 76 to develop a gating signal on a line 94 and a signal representing the complement thereof on a line 96. Responsive to the complementary gating signals developed on lines 94 and 96, circuit 78 alternately couples the pulses developed on line 90 to line 62 and line 64. Controller 80 and 82 compare portions of the levels of the lamp-current-indicating signal developed on line 68 and the lamp-voltage-drop-indicating signal developed on line 58 with reference levels to develop the control signals on lines 88 and 92, respectivley.

For a further discussion of generator 30 and network 28, the reader is referred to my U.S. Pat. No. 4,415,839.

Figure 2:
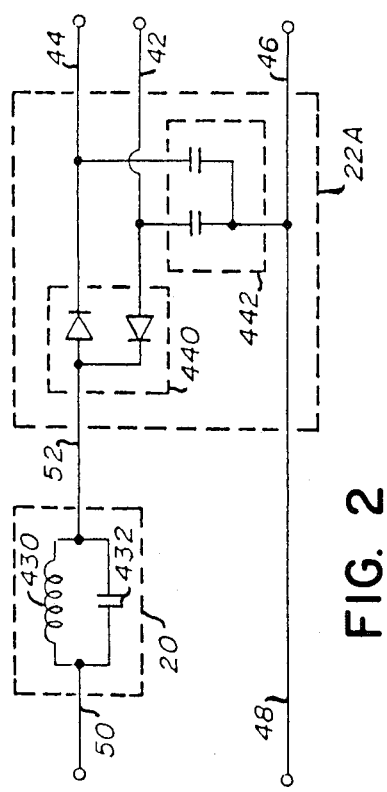
FIG. 2 is a schematic diagram further illustrating the power-factor-correcting network with the principal components of the power supply both shown in FIG. 1.

Turning now to FIG. 2, power-factor-correcting network 20 is illustrated in conjunction with the principal components, designated 28A, of power supply 28 (shown in FIG. 1), the components also being representative of the principal components of most, simple, power supplies. As previously indicated, network 20 is connected in series with the input of power supply 22A across the AC power line, the network being connected between hot line 50 and line 52 and power supply 22A being connected between line 52 and neutral line 48, for 110 volt power mains. Comprising network 20 is a choke 430 and a capacitor 432 the combination connected in parallel in what may be referred to as a trap configuration, the choke and capacitor having suitable reactances whereby the trap is resonant at a frequency higher than the third and lower than the fourth harmonic frequencies of the AC power line frequency, a frequency chosen to increase the power factor power supply 22A presents to the AC power line. Power supply 22A includes means for rectifying 440 current from the AC power line and means for filtering 442 the rectified current to develop a source of DC power. Of course, rectifying means 440 may include means for voltage conditioning, such as a transformer, to adjust the potential developed by power supply 22A as appropriate. Further, filtering means 442 may include a pair of chokes each disposed in series with a respective one of the lines 42 and 44 between rectifying means 440 and the remainder of filtering means 442 or a single choke disposed in series with line 52 between network 20 and rectifying means 440. In this case, network 20 is most advantageous where the choke has an inductance which is less than the critical inductance for an inductive input power supply. Although the preferred embodiment of power supply 22A is in the form of a conventional voltage doubler, any other suitable configuration may be employed.

As is no doubt obvious, absent network 20, power supply 22A draws current from the AC power line in synchronization with the peaks thereof, causing power factor problems and third harmonic distortion problems. With network 20 present, such problems are reduced or avoided. Network 20 automatically synchronizes with the current demands of power supply 22A to present a relatively high impedance in synchronization with the power line peaks to limit the current the power supply can draw coincidently therewith. Thus, by suitably selecting the values of choke 430 and capacitor 432 the Q of the trap may be optimized for power supply 22A to minimize or eliminate power factor problems.

It is important to note that the rectifier and filter capacitor, rather than acting as a resistive load, act as a time-varying non-linear load. Thus, were a high Q parallel resonant circuit used to block one harmonic, such as the third harmonic, the level of the other harmonics may increase. As a consequence, the power factor may show little, if any, improvement. Additionally, high Q circuits are wasteful, energy-wise. By employing a single, low Q, parallel resonant circuit, having a resonant frequency of from 200 to 220 Hz (for 60 Hz operation) and a Q of from 1 to 1½, for example, great success has been achieved in reducing the level of harmonics from the third through the eleventh (employing, for 120 volt 60 Hz 120 watt service, a choke inductance of 87 mH and a capacitor capacitance of 6.8 mfd. Although a choke inductance of 87 mH and a capacitor capacitance of 6.8 mfd is presently preferred, a choke inductance of 78 mH and a capacitor capacitance of 10 mfd have also been employed.)

In another embodiment, a non-linear (non-saturating) choke is employed in place of choke 430. Preferably, a non-linear choke is chosen which has an inductance that changes during each AC cycle such that the total energy stored (in the capacitor and choke) changes during the cycle to cause the AC current drawn from the line (by the network (20) and the power supply (22A)) to best approximate a sine wave that is in phase with the AC line voltage. (For 120 volt 60 Hz 120 watt service, the presently preferred non-linear choke has 330 turns of No. 23 wire wrapped on a laminated core of grain-oriented silicon steel, the core being of the type commonly designated EI62 and having a gap which is chosen to set the choke inductance at 80 mH with an applied AC 60 Hz voltage of 20 volts. Over a cycle, the inductance of such a choke changes by approximately a factor of 2. With such a choke, a mylar capacitor having a capacitance of 6.8 mfd is preferred.)

Figure 3:
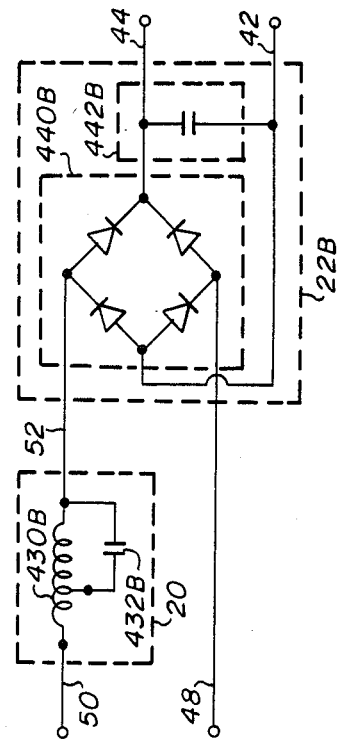
FIG. 3 is a schematic diagram illustrating another embodiment of the power-factor-correcting network in accordance with the present invention.

Turning now to FIG. 3, the presently preferred embodiment of network 20 is shown to include a tapped, non-linear choke 430B. In this embodiment, the distal ends of the choke (430B) winding are connected between lines 50 and 52; and, the capacitor (432B) is connected between one end and the winding tap. (Preferably, the 330 turns of the above-mentioned choke are tapped such that the (6.8 mfd) capacitor is connected across 300 of the turns.)

Operationally, if the choke were a "perfect choke" and all flux lines linked, it would make little difference if the capacitor were connected across a portion of the choke or (a capacitor the value of which has been adjusted for the turns ratio) were connected across the whole choke. Since the choke does not have perfect flux linkage, the network (20) operates much as a network which is comprised of a choke that is connected in series with a choke which is connected in parallel with the capacitor. However, because there is some common flux, unlike the simple two choke example, the inductance of the "series choke" varies with that of the "parallel choke." As a consequence, the "series choke" provides a much higher impedance to high frequency harmonics than would otherwise be the case.

Although it is contemplated that after having read the preceding disclosure certain alterations and modifications of the present invention will no doubt become apparent to those skilled in the art, it is intended that the following claims be interpreted to cover all such alterations and modifications as fall within the true spirit and scope of the invention.

What is claimed is:

1. A network for use with an AC power line having a predetermined power line frequency and for use with a power supply having an input that presents a predetermined power factor to the line when directly connected thereacross, the network for connection in series with the input across the line to increase the power factor the input presents to the line, the network comprising in combination: a capacitor having a predetermined capacitance and a choke connected in parallel with said capacitor, said choke having a predetermined inductance whereby said capacitor and said choke resonate at a frequency greater than three and less than four times the power line frequency.

2. A network as recited in claim 1 wherein said network has a Q which is less than 5.

3. A power supply for use with an AC power line having a predetermined power line frequency, the supply for developing a source of DC power from power obtained from the line so as to present a high power factor to the line, the supply comprising in combination: means for rectifying AC power line current, means for filtering the rectified current to develop the source of DC poewr, and a network coupling the rectifying means to the AC power line, the network including a capacitor having a predetermined capacitance and a choke connected in parallel with said capacitor, said choke having a predetermined inductance whereby said capacitor and said choke resonate at a frequency greater than three and less than four times the power line frequency.

4. A power supply as recited in claim 3 wherein said network has a Q which is less than 5.

5. A network for use with an AC power line and for use with a power supply having an input that presents a predetermined power factor to the line when directly connected thereacross, the network for connection in series with the input across the line to increase the power factor the input presents to the line, the network comprising in combination:
   a pair of terminals;
   a non-linear choke including a winding having a first end connected to one of said pair of terminals, a second end connected to the other one of said pair of terminals, and a tap; and
   a capacitor connected between one of said pair of terminals and said tap.

6. A power supply for developing a source of DC power from power obtained from an AC power line so as to present a high power factor to the line, the supply comprising in combination:
   means for rectifying AC power line current;
   means for filtering the rectified current to develop the source of DC power; and
   a network including,
      a non-linear choke employing a winding having a pair of ends connected to couple the rectifying means to the AC power line, and a tap, and
      a capacitor connected between one of said ends and said tap.

* * * * *